United States Patent Office 2,865,892
Patented Dec. 23, 1958

2,865,892

PROCESS FOR STABILIZING MOLTEN POLY-ETHYLENE TEREPHTHALATE

Emmette Farr Izard, Kenmore, and Cyrus Efrem Sroog, Grand Island, N. Y., assignors to E. I. du Pont de Nemours & Company, Wilmington, Del., a corporation of Delaware No Drawing. Application September 30, 1953
Serial No. 383,420

2 Claims. (Cl. 260—75)

This invention relates to a process of stabilizing the molecular weight of a polymer in molten form, and, more particularly, to a process of stabilizing the molecular weight of a molten polyethylene terephthalate.

The production of the novel class of film- and fiber-forming, linear polyesters of terephthalic acid and a glycol of the series $HO(OH_2)_nOH$ where "$n$" is an integer from 2 to 10 inclusive, is fully disclosed in United States Patent No. 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxyethyl terephthalate monomer which is polymerized to polyethylene terephthalate under reduced pressure and at elevated temperatures.

In large scale or commercial production of polyethylene terephthalate for extrusion into films or filaments, it is frequently necessary to hold large quantities of molten polymer prior to metering the polymer into extrusion orifices. For example, it may be necessary to mix streams of molten polymer evolving from different sources. In such situations, the streams of molten polymer may not be of the same molecular weight as reflected by measurement of intrinsic viscosity. Therefore, prior to extruding the molten polymer into film or filament form, it is usually necessary to blend these streams of polymer to form a polymer of substantially uniform intrinsic viscosity. During such time-consuming blending operations, or during any extensive holdup of relatively large batches of molten polymer, it is necessary to prevent degradation of the polymer, i. e., maintain the molecular weight (intrinsic viscosity) substantially at a relatively fixed predetermined value. This maintenance of intrinsic viscosity at substantially a predetermined value will hereinafter be referred to as viscosity or molecular weight stabilization. It is obvious that appreciable degradation of the intrinsic viscosity of a polymer prior to extrusion into film or filament form is highly undesirable from the standpoint of the effect upon production of filaments or films of substantially uniform properties.

In holding up relatively large batches of molten polyethylene terephthalate at elevated temperatures, e. g., at temperatures within the range 265–280° C., for periods of time ranging from 1–6 hours, while continuously stirring the batch, it has been observed that intrinsic viscosity begins to degrade, i. e., fall below the original value, when the molten polymer is maintained at substantially atmospheric pressure. For example, a 50-lb. batch of polymer having an original intrinsic viscosity of about 0.63 may suffer a reduction in viscosity after a six-hour holding period to a value of about 0.56. Consequently, extrusion of such polymer through extrusion orifices, for example, a slot type orifice for extrusion of film, which orifice has been adjusted for extrusion of polymer having a viscosity of about 0.63, usually results in the formation of film having excessively non-uniform caliper; and the physical properties of the film ultimately produced therefrom will not be equal in all respects to film produced from higher molecular weight polymer.

An object of the present invention, therefore, is to provide a process of stabilizing the molecular weight (intrinsic viscosity) of a molten polyethylene terephthalate at elevated temperatures for substantial periods of time. A further object of the present invention is to provide a process of stabilizing relatively large batches of molten polyethylene terephthalate for periods up to about six hours. A still further object of the present invention is to provide a process of stabilizing the molecular weight of a polyethylene terephthalate during holding of a relatively large batch of the molten polymer between the polymerization step and the step of metering the molten polymer into extrusion apparatus. Other objects will be apparent from the description of the invention presented hereinafter.

The above objects are accomplished in accordance with the present invention by maintaining the molten undegraded polyethylene terephthalate of the desired intrinsic viscosity at a temperature within the range 265–280° C., and adjusting the pressure of the system to at least 15 millimeters of mercury and no greater than about 40 millimeters of mercury, maintaining an inert relatively quiescent, substantially oxygen-free atmosphere above the surface of the molten polymer, and continuously agitating the molten polymer.

By "undegraded" polyethylene terephthalate, as used herein, is meant polyethylene terephthalate, the intrinsic viscosity of which (and, hence, the average molecular weight) has not fallen below the maximum intrinsic viscosity reached during the polymerization step. Normally, in any commercial operation, the molten polymer to be subjected to the stabilization process is freshly formed; and substantially immediately after polymerization has been effected to the desired degree, the molten polymer is subjected to the stabilizing conditions of this invention. Hence, in normal operations, the polymer in all cases will be "undegraded," but it must be emphasized that molecular weight of the polymer cannot be maintained once degradation has begun.

As used herein, the expression, "intrinsic viscosity," denoted by the symbol $(n)_0$, is a measure of the degree of polymerization of the polyester and may be defined as $$\text{limit} \frac{ln(n)_r}{C}$$

as C approaches 0, wherein $(n)_r$ is the viscosity of a dilute phenol-tetrachloroethane solution (60–40) of the polyester divided by the viscosity of the phenol-tetrachloroethane per se measured in the same units at the same temperature, and C is the concentration in grams of polyester per 100 cc. of solution.

Although the present invention will be described hereinafter with specific reference to polyethylene terephthalate, it should be understood that the process of the present invention may also be applied to various modified polyethylene terephthalates, that is, modified with small amounts of acids or their esters, from the group consisting of isophthalic acid, bibenzoic acid, sebacic acid, adipic acid, 1,5 naphthalic acid, 2,6 naphthalic acid, and hexahydro terephthalic acid. For example, such modified polyethylene terephthalates may be formed by reacting ethylene glycol, dimethyl terephthalate, and a small quantity, e. g., up to 15%, of a low alkyl ester of one of the acids mentioned above.

In order to maintain the polymer in the molten form and to facilitate agitation thereof, the temperature must be at least about 265° C. and may be as high as about 280° C. Preferably, the temperature is within the range from 275° C. to 280° C.

The pressure range, under which the molten polymer mass must be maintained in order to insure molecular weight stability, is quite critical. If the pressure on the melt is not maintained at a sufficiently high level, i. e., at least 15 mm., further condensation may occur with a consequent increase in intrinsic viscosity. This is particularly true where the polymerization is stopped considerably short of a maximum value, as in the preparation of polymer for conversion into filaments. In general, further polymerization will not occur if the pressure is at least 15 millimeters of mercury. On the other hand, the maintenance of pressures substantially above 40 mm. of mercury results in more rapid reduction in molecular weight. Therefore, particularly with large batches (50–2,000 pounds) of molten polymer, the pressure should be maintained within the range of from about 15 mm. to about 40 mm. of mercury to insure substantial molecular weight stability.

Another critical aspect of the present invention is that of maintaining an oxygen-free atmosphere above the surface of the molten polymer mass during the hold-up period (period during which constant molecular weight is maintained). This is accomplished by bleeding an inert gas, e. g., nitrogen or carbon dioxide, into the atmosphere above the molten polymer. The inert gas is metered into the system under very low pressure, e. g., through a reducing valve and then through a capillary system. The introduction of the inert gas into the atmosphere above the molten polymer acts as an oxygen scavenger, thus ensuring the maintenance of a substantially oxygen-free atmosphere above the molten polymer. Stabilization cannot be accomplished without maintaining a substantially oxygen-free atmosphere above the molten polymer. Furthermore, the inert, substantially oxygen-free atmosphere must be relatively quiescent. In actual operations, it has been shown that an appreciable increase, i. e., increase over a relatively quiescent state, in the velocity of the inert gas, e. g., nitrogen, over the surface of the molten polymer (even under the temperature and pressure conditions recited hereinbefore) leads to effecting further polymerization of the molten polymer instead of substantial stabilization of the molecular weight.

In the preparation of bis-2-hydroxyethyl terephthalate, which is subsequently polymerized to form polyethylene terephthalate, an ester interchange is carried out between ethylene glycol and dimethyl terephthalate. Normally, an ester interchange catalyst is employed, for example, litharge, combinations of lithium hydride and zinc acetate, combinations of magnesium acetate and cadmium stearate. This initial condensation reaction may be conveniently carried out at atmospheric pressure and at a temperature range between 140–220° C., and preferably between 150–200° C. Methanol is continuously withdrawn from the reactor during ester interchange, and termination of evolution of methanol indicates substantial completion of the ester interchange step.

The polymerization reaction is usually effected in the liquid, i. e., melt, phase. In the liquid phase, the reaction must be carried out at reduced pressure, normally in the vicinity of 0.05–5.0 millimeters of mercury. This reduced pressure is necessary to remove the free ethylene glycol which emerges from the polymer as a result of the condensation reaction. If reduced pressure is not used, all the ethylene glycol will not be removed; and it will not be possible to form a fiber or film-forming polymeric material, but rather, a low molecular weight polymer, too brittle for fibers or films. A temperature between about 230° to about 290° C., and preferably between about 260° to about 275° C., should be maintained during the polymerization step. Normally, a polymerization catalyst is employed, for example, litharge or antimony trioxide.

The following specific examples further illustrate the principles and practice of this invention:

In each of the examples, polyethylene terephthalate was prepared by following the general procedure above outlined. After polymerization was carried out (in a 50-pound capacity autoclave provided with a stirrer) to the desired intrinsic viscosity, e. g., about 0.63, the temperature was adjusted to about 275° C. and, with constant stirring, the pressure was adjusted to the various values specified in the following table for a period of eight hours. A steady stream of nitrogen gas was bled into the autoclave above the level of the molten polymer. The nitrogen was introduced into the system through a capillary system via a reducing valve. Intrinsic viscosity measurements were made at hourly intervals with the results shown in Table I.

*Table 1*

| Example | Catalyst Combination, percent [1] | Polymerization Conditions, °C/P (mm.) | Adjusted to, mm. | Intrinsic viscosity, hours after adjustment | | | | | | | | |
|---|---|---|---|---|---|---|---|---|---|---|---|---|
| | | | | 0 | 1 | 2 | 3 | 4 | 5 | 6 | 7 | 8 |
| 1 | 0.006% LiH, 0.035% Zn(OAc)$_2$,[1] 0.03 Sb$_2$O$_3$. | 275/0.2–0.5 | 10 | 0.63 | 0.65 | 0.66 | 0.69 | 0.71 | 0.74 | 0.75 | 0.71 | 0.71 |
| 2 | 0.006% LiH, 0.035% Zn(OAc)$_2$,[1] 0.03 Sb$_2$O$_3$. | 275–276/0.1–0.3 | 20 | 0.64 | 0.65 | 0.63 | 0.63 | 0.64 | 0.64 | 0.63 | 0.63 | 0.63 |
| 3 | 0.006% LiH, 0.035% Zn(OAc)$_2$,[1] 0.03 Sb$_2$O$_3$. | 275/0.25 | 40 | 0.63 | 0.64 | 0.64 | 0.64 | 0.64 | 0.64 | 0.63 | 0.63 | 0.63 |
| 4 | 0.006% LiH, 0.035% Zn(OAc)$_2$,[1] 0.03 Sb$_2$O$_3$. | 278/0.2 | 50 | 0.64 | 0.62 | 0.63 | 0.63 | 0.63 | 0.61 | 0.59 | 0.58 | 0.57 |
| 5 | 0.006% LiH, 0.035% Zn(OAc)$_2$,[1] 0.03 Sb$_2$O$_3$. | 275/0.2–0.5 | 75 | 0.62 | 0.65 | 0.63 | 0.63 | 0.60 | 0.58 | 0.57 | 0.55 | 0.55 |
| 6 | 0.006% LiH, 0.035% Zn(OAc)$_2$,[1] 0.03 Sb$_2$O$_3$+0.35% tricresyl phosphate. | 276–277/0.2–0.9 | 100 | 0.61 | 0.57 | 0.57 | 0.57 | 0.56 | 0.55 | 0.55 | 0.55 | 0.54 |
| 7 | 0.006% LiH, 0.035% Zn(OAc)$_2$,[2] 0.03 Sb$_2$O$_3$. | 277/0.5–0.7 | 100 | 0.63 | 0.63 | 0.60 | 0.59 | 0.58 | 0.58 | 0.57 | 0.56 | 0.56 |
| 8 | 0.006% LiH, 0.035% Zn(OAc)$_2$,[2] 0.03 Sb$_2$O$_3$. | 278–280/0.1 | 200 | 0.63 | 0.61 | 0.59 | 0.57 | 0.57 | 0.56 | 0.55 | 0.54 | 0.53 |
| 9 | 0.006% LiH, 0.035% Zn(OAc)$_2$,[2] 0.03 Sb$_2$O$_3$. | 277–278/0.1 | 760 | 0.63 | 0.59 | 0.59 | 0.59 | 0.58 | 0.56 | 0.56 | 0.56 | 0.55 |

[1] Wt. percent of polymer.
[2] Zinc acetate dihydrate.

Example 1 illustrates adjusting the pressure in the autoclave, after an intrinsic viscosity of 0.63 was reached, to 10 millimeters of mercury. Subsequent measurements of intrinsic viscosity of this batch, the batch being constantly stirred, indicate that the intrinsic viscosity increases. This is probably because the polymerization reaction tends to continue at a pressure of 10 millimeters, although the polymerization reaction had been carried out under a pressure within the range 0.2–0.5 millimeter. On the other hand, adjustment of the pressure to 15–40 millimeters results in substantial stabilization at the original intrinsic viscosity.

The process of the present invention is highly useful and advantageous in a continuous process for the preparation of a polyethylene terephthalate in the form of films or filaments. For example, in the preparation of continuous quantities of molten polyethylene terephthalate of a particular molecular weight (intrinsic viscosity), it may be necessary to hold this polymer under molten conditions for a certain period of time prior to its being metered into an extrusion apparatus. Under such conditions, therefore, the present process may be employed to maintain the molten polymer at an intrinsic viscosity substantially equivalent to that of the polymer issuing from any continuous or batch polymerization equipment. The present invention is also highly useful in holding batches of polymer which are blends of several polymer streams, for example, a stream of polymer from a continuous process and a source of polymer from a large batch reactor. For example, in supplementing a process of continuous polymerization, a large batch reactor may be employed to prepare large quantities, for example, 1000–2000 lbs. of molten polymer. Molten polymer from these two sources may then be blended in suitable mixing equipment and thereafter held in a large vessel prior to being metered into extrusion equipment. Obviously, the process of the present invention is highly useful in any process which requires holding large quantities of molten polymer for durations up to about eight hours. For example, in a system comprising a blending vessel (jacketed and provided with a stirrer), an autoclave (wherein polymerization was carried out) and a continuous unit (which provided a continuous supply of polymer), the blending vessel acted as a hold-up vessel wherein molten polymer was maintained at substantially constant intrinsic viscosity (between 0.59–0.61) for durations of about six hours; that is, the polymer in the blender was changed about every six hours. The polymer from the continuous unit was being continuously introduced into the blender, and about every six hours a batch charge of molten polymer was introduced into the blender from the autoclave. Blended polymer was continuously being withdrawn from the blender, and this polymer was continuously fed to an extrusion unit for continuous extrusion of polyethylene terephthalate film. The temperature of the blender was maintained at 277–278° C., and the pressure was maintained within the range of 15–20 mm. Over a three-day period of operation during which time the intrinsic viscoscity was measured every hour, the viscosity was always within the range from 0.59–0.61.

We claim:

1. A process for stabilizing the molecular weight of a polyethylene terephthalate polymer in molten form which comprises maintaining an undegraded polyethylene terephthalate at a temperature of from about 265° to about 280° C., and under a reduced pressure within the range of from 15 to 40 millimeters of mercury, maintaining an inert relatively quiescent, atmosphere substantially free of free oxygen above the surface of the molten polymer, and continuously stirring the melt.

2. The process of claim 1 wherein the temperature is within the range of 275°–280° C. and an atmosphere essentially composed of nitrogen is maintained above the surface of the molten polymer.

References Cited in the file of this patent

UNITED STATES PATENTS 2,503,251     Edwards et al. _____ Apr. 11, 1950

OTHER REFERENCES

Hardy: J. S. C. I. 67, pages 426–432, November 1948.

UNITED STATES PATENT OFFICE

Certificate of Correction

Patent No. 2,865,892 December 23, 1958

Emmette Farr Izard et al.

It is hereby certified that error appears in the printed specification of the above numbered patent requiring correction and that the said Letters Patent should read as corrected below.

Column 1, line 21, for the formula reading $HO(OH_2)_nOH$ read $—HO(CH_2)_nOH—$;

columns 3 and 4, Table 1, second column thereof, opposite Example 1 and Example 6, respectively, for that portion reading "$Zn(OAc)_2,^1$" read $—ZN(OAc)_2,^2—$.

Signed and sealed this 2nd day of June 1959.

[SEAL]

Attest:
KARL H. AXLINE,
*Attesting Officer.*

ROBERT C. WATSON,
*Commissioner of Patents.*